May 22, 1956 L. G. BOSTWICK 2,747,092

VIBRATING REED OSCILLATOR OF THE CONTACT TYPE

Filed Aug. 26, 1953

L. G. BOSTWICK

BY Guy T. Morris

ATTORNEY 2,747,092

VIBRATING REED OSCILLATOR OF THE CONTACT TYPE

Lee G. Bostwick, Florham Park, N. J., assignor to Bell Telephone Laboratories, Incorporated, New York, N. Y., a corporation of New York Application August 26, 1953, Serial No. 376,645

13 Claims. (Cl. 250—36)

The present invention relates to oscillators or generators of alternating currents of sinusoidal wave form in which the frequency is determined by a mechanically tuned vibrating system, electromagnetically driven and having a contact that controls current to sustain the oscillations.

The general object of the invention is an electric wave generator of the indicated type which will produce practically sine wave output currents of highly stable frequency.

The generator of the invention is characterized by simplicity of construction and economy in operation.

The generator to be disclosed and claimed herein employs certain novel features of construction one of which is a circuit network including the driving coil which has the characteristics of a low-pass filter with its cut-off frequency at or close to the operating frequency. This low-pass filter characteristic is helpful in maintaining frequency stability and suppressing harmonics.

The most important frequency-determining element of this oscillator is a sharply tuned vibrating mechanical system, a preferred form of which is a tuning fork although not limited to this form. This vibrating element is actuated electromagnetically by means of a coil that modulates a magnetic field set up by a permanent magnet between the tines of the tuning fork. Attached to one of the tines is a precious metal bar that mates with another very fine precious metal wire positioned to barely contact when the tine is without vibration. When the tine vibrates the contact makes and breaks current from a battery to an electrical network which includes the above actuating coil. This network has the form of a low-pass filter with a cut-off frequency near the resonance frequency of the fork and serves to alter the phase of the current through the actuating coil relative to that through the contact and also to filter spurious frequencies in the contact circuit from the output of the oscillator.

The round trip phase shift experienced by a given impulse from its inception and during its propagation around the oscillator loop until it arrives at the place of beginning in proper phase to augment the original impulse is of course 360 degrees. Most of this phase shift occurs in the electromechanically resonant system and the remainder occurs in the network having the low-pass filter characteristic. The phase shift changes most rapidly with frequency at the resonant frequency of the vibrating system and at the cut-off frequency of the network, the rate of change of phase in the latter case being smaller than that in the former. Thus a tendency for the frequency to change is opposed by the shift of phase in each of the two parts of the closed loop; that is, in the resonant system and in the electrical network. The principal frequency determining element is the mechanical vibrating system. The electrical network with its less steep phase shift characteristic supplements the mechanical resonant system in restoring the proper total phase shift with but slight shift in frequency The electrical circuit network thus assists in maintaining constancy of frequency. It also assists in maintaining purity of wave form by suppressing currents of harmonic frequencies that may tend to be produced.

A further novel feature of the present oscillator comprises a sleeve which can be adjustably inserted between the driving coil and the tines of the fork to control the amplitude of the generated oscillations.

These and other features and objects of the invention will be more fully understood from the detailed description to follow of an illustrative embodiment of the invention in which.

Figure 1:
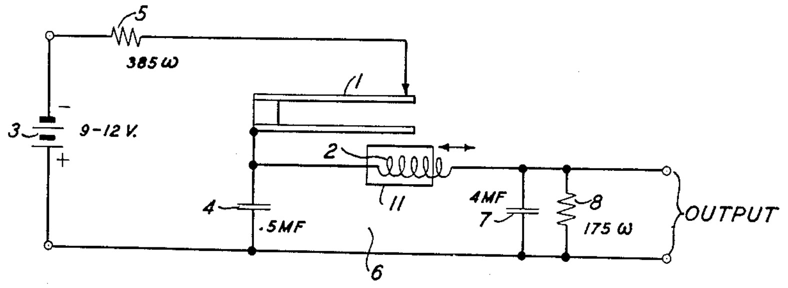
Fig. 1 illustrates in schematic form a preferred embodiment of the invention.

Fig. 1 shows the circuit arrangement of the oscillator in schematic form with circuit constant suitable for a 400-cycle output. The inductance 2 shown is the drive coil of the tuning fork 1 which has a resonance frequency of 400 cycles. When a current of this frequency is passed through the coil the tines of the tuning fork move closer together on one-half of the current cycle during which the contact is broken and apart on the other half cycle during which the contact is closed. At resonance the tine velocity is in phase with the coil current and the tine displacement amplitude leads the coil current by 90 degrees.

When the contact closes, a current pulse flows from the battery 3 through the 385-ohm resistance 5 in series with a network consisting of the .5-microfarad condenser 4, the drive coil inductance 2, and the 175-ohm resistance 8 shunted by a 4-microfarad condenser 7. This pulse is asymmetrical and repeats with the same period and frequency as the fork. Such repetitive pulses may be resolved into sinusoidal components with a fundamental of the fork frequency and a series of harmonics. The network as defined above is in the form of a low-pass filter with a cut-off frequency approximately equal to that of the fork frequency. This network thus allows the fundamental frequency of the pulse to pass and attenuates the harmonics. The passed fundamental frequency current is shifted 90 degrees and flows through the coil. Inasmuch as this fundamental frequency is the same as the resonance frequency of the fork, the fork vibrates, operating the contacts and again developing more pulses which sustain the vibrations as a closed loop feedback system. A total phase shift around the loop of 360 degrees as required for sustained oscillations in any feedback system, results from the 90-degree shift in the electromechanical system, plus the 90-degree shift in the network, plus a 180-degree shift determined by the battery polarity. The required amplitude relations are obtained by adjusting the battery voltage and the electromagnetic coupling between the coil and the fork as will be discussed later. In addition to providing the 90-degree phase shift necessary to permit sustained oscillations at the resonance frequency, the network serves to improve the output wave form by filtering harmonics in the contact circuit from the output; the 4-microfarad condenser 7, is included in the network primarily to improve the filtering.

Figure 2:
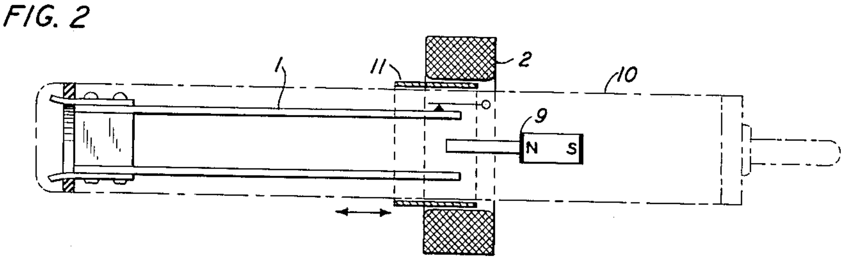
Fig. 2 illustrates in greater structural detail the mechanical vibratory system and related elements of the Fig. 1 over-all organization.

Fig. 2 shows in schematic form the construction of the tuning fork 1 with contacts and the electromagnetic drive system. This construction is substantially like that described in applicant's application Serial No. 191,027, filed October 19, 1950, now U. S. Patent No. 2,673,482 dated March 30, 1954. The fork is fabricated with two tines of a nickel-iron alloy with titanium and/or molybdenum that are brazed at one end to a separating block. Inserted between the other ends of the two tines is the pole-piece of a permanent magnet 9 which sets up a strong magnet field in the gaps between the pole-piece and the tines. Surrounding the magnet gaps is the drive coil 2 through which a current of frequency equal to the resonance frequency of the fork may be passed to modulate the magnet field and cause the tines to vibrate. A precious metal contact bar is welded to one of the tines and barely makes contact with a very fine precious metal wire when the tines are motionless.

Inside the coil and surrounding the gaps between the pole-piece and the tines is a cylindrical sleeve 11 of magnetic alloy of high permeability. When this sleeve is slid inside the coil, as on housing 10 shown fragmentarily, it shunts to various degrees depending on its position, the flux that would otherwise be produced by the coil in the magnetic gaps. It thereby reduces the electromechanical coupling and makes it possible to regulate the tine displacement amplitude independently of the coil current. In the oscillator circuit this adjustment of the electromechanical coupling serves as a feedback loop gain adjustment analogous to the amplifier gain control in electrical feedback oscillators.

Figure 3:
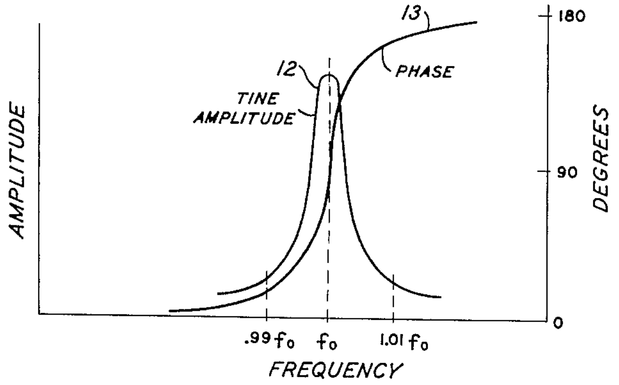
Figs. 3, 4 and 5 illustrate certain operational characteristics of the invention.

Fig. 3 shows by curves 12 and 13, respectively the amplitude and phase of the tine displacements relative to the coil current in the device shown in Fig. 2. The amplitude and phase are plotted against frequency with a widely expanded frequency scale. A sharp displacement maximum occurs at the resonance frequency $f_0$ of the tuning fork when the coil current is kept constant and the frequency is varied. At frequencies 1 per cent from the resonance frequency as indicated, the amplitude is a small fraction of that at resonance. The phase of the tine displacement relative to the coil current also changes rapidly with frequency; the maximum rate of change occurs at resonance where the displacement is 90 degrees out of phase with the current. This rapid change in amplitude and phase serves to stabilize the oscillator when operating near the resonance frequency of the tines.

Figure 4:
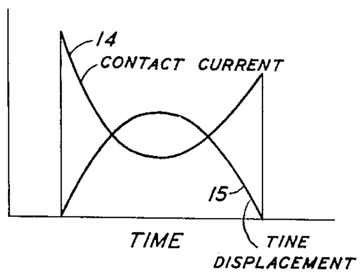

Fig. 4 is a representation of the contact current wave form 14 shown in phase or time relationship to the tine displacement wave form 15 for one battery polarity. Shown is a one-half of a cycle during which the contact is closed. Since the contacts are initially adjusted to be just closed with no vibration, the battery circuit is closed when the tine displacement passes through zero. A rapid build-up of the current first occurs followed by a decay. The initial shape of the pulse is determined mainly by the charging current of the .5-microfarad condenser 4. A second build-up then occurs determined mainly by the coil energizing current and this is followed by an abrupt decay to zero as the tine displacement again passes through zero and the contact opens. A contact current pulse is thus generated having a shape as shown. It is evident that this wave form has a strong frequency component having the same frequency as that of the tine and opposite in phase. This current component shifted 180 degrees with respect to the tine displacement and further shifted in phase 90 degrees in the electromechanical system, plus 90 degrees in the network serves to maintain the oscillations as was discussed previously.

Figure 5:
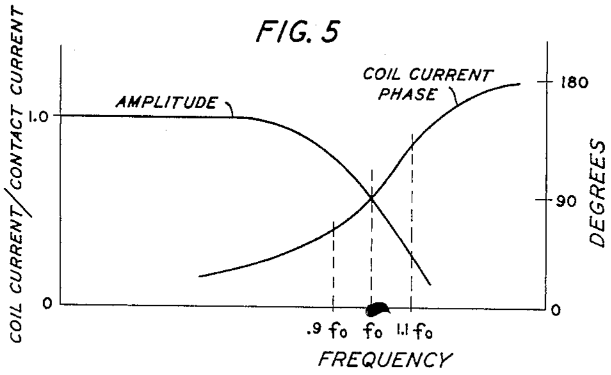

Fig. 5 illustrates the transmission characteristic of the network consisting of the .5-microfarad condenser 4, the coil 2, and the 175-ohm resistor 8 shunted by the 4-microfarad condenser 7. Shown is the amplitude ratio and phase of currents through the coil relative to currents of varied frequency set up in the contact circuit. This characteristic is like that of a low-pass filter in which the amplitude ratio is unity at low frequencies and drops off at the high frequencies; the phase over the frequency range changes from zero to 180 degrees. In accordance with one feature of this invention the elements of this network are chosen so that the frequency $f_0$ at which the phase angle equals 90 degrees is approximately equal to the resonance frequency of the tuning fork. This frequency is referred to herein as the cut-off frequency. Although the phase changes it will be noted that the rate of change is much less than that shown in Fig. 3. This fact makes it unnecessary in practice to place the frequency of 90 degrees phase shift in the network exactly at the fork resonance frequency because deviations in the network are readily compensated by small shifts in the fork frequency.

In addition to providing the necessary phase shift the network being a low-pass filter attenuates the harmonics in the contact circuit and gives a sinusoidal output wave form. The pulse illustrated in Fig. 4 includes strong harmonics in addition to the fundamental and these are attenuated by the network before reaching the output circuit. An output wave form in which the harmonic energy is less than one per cent of the fundamental energy has been readily obtained.

Although the disclosure is with reference to a particular embodiment of mechanical vibrating element, it is obvious that other, analogous, mechanical vibrating elements may be used. The same is true as to other elements in the organization as a whole, including circuits as well as structure. In particular, other configurations of network may be applicable to achieve the requisite 90-degree phase shift and tending to make the organization adaptable to a higher frequency.

What is claimed is:

1. A wave generator comprising a sharply tuned mechanical vibrating system, an actuating contact circuit including contacting means adapted to be operated by the vibrating system, a coil for electromagnetically driving the vibrating system, an output circuit from which wave energy may be derived, and a low-pass filter-like network connecting the contact circuit and the output circuit, the filter network comprising the driving coil as one element and having a cut-off frequency at or near the resonance frequency of the tuned vibrating system to constitute means for providing a phase shift of substantially 90 degrees between the current in the contacting means and the current in the driving coil.

2. A wave generator comprising a mechanically tuned vibratory element, a driving means for said element, a direct-current energy supply circuit, an output circuit from which wave energy may be derived, and a network connecting the energy supply circuit and the output circuit, said network comprising the driving means and frequency discriminating and phase shifting elements whereby vibration of the tuned mechanical element is sustained at or near its resonance frequency.

3. The wave generator recited in claim 2 in which said intercoupling network comprises a low-pass filter network including as an inductance element said driving means, and having a cut-off frequency coincident with the natural vibratory frequency of said vibratory element.

4. The wave generator recited in claim 2 in which said direct-current energy supply circuit includes a contact operated by the tuned vibrating element.

5. The wave generator recited in claim 2 in which said driving means comprises a magnetic coil, and additionally comprising a magnetic sleeve-like element adapted to be variably interposed in the magnetic circuit of said coil and said vibratory element whereby to vary the coupling therebetween.

6. A vibrating reed generator comprising a tuned reed, a driving coil therefor, a contact opened and closed by the vibration of said reed, a source of direct current in circuit with said driving coil and said contact, and an output circuit for the generated oscillations, said coil constituting the series inductance element of a low-pass filter including a shunt capacitance at each end of said element, said filter having its cut-off frequency substantially coincident with the natural frequency of vibration of said reed.

7. A contact oscillator comprising a sharply resonant mechanically vibratory element, a driving coil therefor, a primary circuit containing a direct-current source and a contact making means actuated by said vibratory element, an output circuit for the generated oscillations, a low-pass filter network between said primary circuit and said output circuit and comprising a series inductance constituted at least in part by said driving coil and at least one shunt capacitance, said filter network being so electrically dimensioned that its cut-off frequency corresponds to the natural frequency of vibration of said vibratory element.

8. The oscillator of claim 7 in which said vibratory element is a tuning fork.

9. The oscillator of claim 7 in which said network comprises in combination, a series inductance-driving coil and a shunt capacitance at each end thereof.

10. The oscillator of claim 7 in which said network comprises in combination, a series inductance-driving coil and a shunt capacitance at each end thereof, together with a shunt matching resistance between said network as so far recited and said output circuit.

11. The oscillator of claim 7 in which the relative movable elements of said contact making means are adapted to remain in very slight contact relationship when not vibrating.

12. The oscillator of claim 7 further comprising a magnetic sleeve-like element adapted to be variably interposed in the magnetic circuit of said driving coil and said vibratory element, whereby to vary the magnetic coupling therebetween.

13. Apparatus for utilizing a sharply resonant mechanically vibratory element to generate waves comprising means for driving electromagnetically said element, means using the vibratory motion of said element to control or modulate energy from a source, and means for altering the phase and magnitude of the modulated energy comprising a filter network having a substantially 90-degree phase shift characteristic and utilizng the driving means as part of the altering means to perpetuate vibration of the mechanical element at its resonance frequency.

References Cited in the file of this patent

UNITED STATES PATENTS

| | | |
|---|---|---|
| 1,906,985 | Marrison | May 2, 1933 |
| 2,101,272 | Scott | Dec. 7, 1937 |

FOREIGN PATENTS

| | | |
|---|---|---|
| 889,362 | France | Aug. 7, 1944 |